(12) United States Patent
Marcerou et al.

(10) Patent No.: US 6,342,962 B2
(45) Date of Patent: *Jan. 29, 2002

(54) OPTICAL SYSTEM FOR TRANSMITTING DATA IN SOLITON FORMAT

(75) Inventors: Jean-François Marcerou, Corbeil-Essonnes; Elisabeth Brun-Maunand, Paris, both of (FR)

(73) Assignee: Alcatel Submarine Networks, Clinchy (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,669

(22) Filed: Jul. 9, 1997

(30) Foreign Application Priority Data

Jul. 10, 1996 (FR) .............................. 96 08614

(51) Int. Cl.⁷ .......................... H04B 10/00; H04B 10/12
(52) U.S. Cl. ........................ 359/141; 359/161; 359/173
(58) Field of Search ................................. 359/138, 158, 359/161, 173, 174, 175, 176, 179, 141

(56) References Cited

U.S. PATENT DOCUMENTS

| | | | | |
|---|---|---|---|---|
| 5,532,861 A | * | 7/1996 | Pirio et al. | 359/161 |
| 5,625,479 A | * | 4/1997 | Suzuki et al. | 359/135 |
| 5,861,971 A | * | 1/1999 | Devaux et al. | 359/176 |
| 5,889,607 A | * | 3/1999 | Suzuki et al. | 359/245 |

* cited by examiner

Primary Examiner—Leslie Pascal
Assistant Examiner—Dalzid Singh
(74) Attorney, Agent, or Firm—Sughrue Mion, PLLC

(57) ABSTRACT

A system for transmitting signals in the form of soliton pulses over long distances using an optical conductor minimizes distortion of the transmitted soliton pulses using, in combination, a phase modulator to prevent temporal jitter of the soliton pulses and a set of filters of the type in which the frequency varies with the location of the filter or a set of saturable absorbent components to prevent deterioration of the signal to noise ratio of the pulses. Applications of the system include transoceanic optical communications.

19 Claims, 1 Drawing Sheet

OPTICAL SYSTEM FOR TRANSMITTING DATA IN SOLITON FORMAT

BACKGROUND OF THE INVENTION

1. Field of the Invention

The present invention concerns an optical data transmission system.

2. Description of the Prior Art

Transmission of data over long distances, especially transoceanic telephone transmission, is increasingly effected optically using optical fibers. This has significant advantages compared to electrical transmission; in particular losses are low and there is less signal distortion.

In such telecommunication systems, in particular for undersea telecommunications, there is a constant need for higher bit rates without degrading signal quality and whilst remaining within reasonable cost limits.

The data transmitted by optical communication systems is in binary form, i.e. the information is represented by "0" bits and "1" bits. The shape of the signals transmitted has a decisive effect on the performance of the transmission system, losses and noise depending on the shape of the signals.

Until now, binary digital signals have mainly been transmitted in the NRZ format, i.e. in the form of rectangular signals, "0" usually being the low level and "1" the high level. For successive "1" the signal remains at the high level and does not return to the "0" level or low level (hence the name of the format: NRZ=no return to zero).

Formats have been researched recently that enhance communication performance. The format of most interest at present is the soliton format. In this format, the "1" are pulses, generally positive (bright soliton) and the "0" are the low level. Between two successive "1", i.e. between two soliton pulses, the signal returns to the low level.

The shape of the soliton pulses as a function of time is the inverse of the square of a hyperbolic cosine. The peak power and the mid-amplitude width of the soliton pulse are linked by a precise relationship that depends on the characteristics of the fiber, namely the Kerr index $n_2$ and the dispersion D. The index $n_2$ is the non-linear part of the refractive index, i.e. the part which depends on the power of the optical signal. This relationship between the peak power and the half-amplitude width is such that the effects of dispersion and of non-linearity cancel each other out. As a result, this shape of pulse does not spread as it propagates, despite the inevitable chromatic dispersion of optical fibers.

Nevertheless, optical transmission systems using soliton pulses are affected by noise and this has to be eliminated. The noise comprises fluctuations in the amplitude of the soliton pulses and fluctuations in the temporal position of the pulses. These temporal fluctuations (also known as "jitter") originate in random fluctuations of the central wavelength of the soliton pulses due to non-linear interaction between these pulses and the spontaneous emission noise of optical amplifiers (or repeaters) on the transmission line; this temporal jitter is further influenced by dispersion and increases with the length of the line and with the number of repeaters. A repeater is an optical amplifier designed to provide a particular optical signal power at its output, the amplification compensating the inevitable attenuation of the optical signal transmitted by an optical fiber.

Various solutions to the problem of reducing or eliminating these fluctuations or jitter from soliton pulses are known in themselves.

A first solution consists in providing on the line at least one modulator which repositions the pulse in time using the clock signal extracted from the data. Better results are expected using a phase modulator. Further information on the correction achieved by a phase modulator of this kind can be found, for example, in an article in IEEE Photonics Technology letters, volume 8, number 3, March 1996, pages 455–457 entitled "Gordon-Haus Jitter Suppression Using an Intra-Span Phase Modulator and Post Transmission Dispersion Compensator" by N. J. Smith, N. J. Doran and W. Forysiak. The above article also mentions that correction by means of a phase modulator can be complemented by a dispersion compensation component.

This phase modulation technique—which is an active correction technique—can be associated with passive compensation using optical filters having a wavelength centered on the wavelength of the line. These filters further stabilize the solitons; the stabilization is only partial, however, since such filters necessarily attenuate the optical signal and therefore require the use of high-gain amplifiers which are costly and can also introduce noise.

Our research shows that active regeneration of soliton pulses using a phase modulator can compensate temporal jitter correctly but cannot satisfactorily correct the amplitude fluctuations of the soliton pulses or prevent the accumulation of dispersive waves.

Another solution to compensating, or correcting, fluctuations of soliton pulses on an optical transmission line consists in using so-called sliding-frequency filtering, i.e. a set of filters distributed all along the line and the central wavelength of which varies from the beginning to the end of the line; for example, the central wavelength of the filter at the start of the line is the lowest and the wavelength of the filter at the end of the line is the highest. The use of such filters is described in the article by Linn F. Mollenauer "Soliton transmission speeds greatly multiplied by sliding-frequency guiding filters" in Optics and Photonics News, April 1994, pages 15–19.

This "sliding-frequency filtering" provides partial correction of the temporal jitter of the pulses without the noise increasing with the number of filters, as with fixed filtering.

Nevertheless, it has been found that using such filters is not entirely satisfactory in terms of correcting temporal fluctuations.

The invention is directed to enabling the implementation of an optical telecommunication system using pulses in the soliton format in which the correction of the fluctuations of the pulses in terms of amplitude and temporal position is particularly effective, with the aim of enabling irreproachable transmission over long distances and at a very high bit rate.

The invention starts from the observed limitations of amplitude correction, mentioned above, and of phase modulation, possibly combined with fixed filtering or dispersion compensation.

SUMMARY OF THE INVENTION

To correct the fluctuations of the soliton pulses, the invention uses the combination of sliding-frequency filtering and phase modulation. Alternatively, saturable absorption components are employed in place of the sliding-frequency filters. For information on these saturable absorption components, reference may be had, for example, to the article entitled "Increased Amplifiers spacing in a Soliton System with Quantum-Well saturable absorbers and Spectral Filtering" published in Optics Letters, volume 19, number 19, Oct. 1, 1994, pages 1514–1516.

Note that in the article by N. J. Smith et al published in IEEE Photonics Technology Letters cited above it is suggested that the use of sliding-frequency filtering in combination with phase modulation is not feasible.

The maximum number of phase modulators on the line is preferably three. Nevertheless, the use of a single phase modulator, preferably half-way along the transmission line, is sufficient to achieve the correction of fluctuations in amplitude and in time of soliton format pulses.

It has been found that, using the invention, it is also possible to reduce the number of repeaters on the line, all other things being equal.

Transoceanic transmission systems having lengths between 6,000 kilometers and 10,000 kilometers using a data bit rate of 20 Gbit/s and a quality factor (of the soliton pulses) Q=12 have been compared. If sliding-frequency filtering is used on its own, it is necessary to have a distance of about 50 kilometers between two successive repeaters, a "sliding-frequency" filter being associated with each repeater.

If phase modulation is used in association with fixed frequency filters, the distance between successive repeaters to achieve the same results in terms of bit rate and quality factor is about 80 kilometers.

In contrast, using the invention, if a single phase modulator is used half-way along the line the minimum distance between two repeaters is 100 kilometers, still with the same bit rate of 20 Gbit/s and quality factor of 12. In this example a filter (of the sliding-frequency filtering process) is also associated with each repeater.

Other features and advantages of the invention will emerge from the description of some embodiments of the invention given with reference to the accompanying drawings.

DETAILED DESCRIPTION OF THE PREFERRED EMBODIMENTS

The installation that will now be described with reference to the figures is an installation for transmitting telephone calls over long distances, in particular using underwater optical fiber cables.

Figure 1:
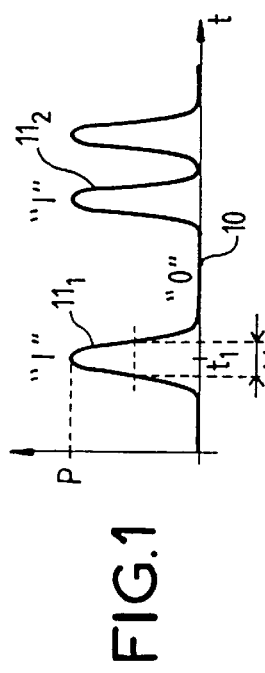
FIG. 1 is a schematic representation of soliton pulses.

This installation transmits digital signals made up of "0" bits, represented by the low level 10 in FIG. 1, and "1" bits, represented by the pulses $11_1$, $11_2$ on the same FIG. 1 diagram.

The pulses $11_1$ and $11_2$ have a width which varies as a function of time (along the abscissa axis) in accordance with a particular law such that their shape is the inverse of the square of a hyperbolic cosine. A pulse of this kind is known as a soliton.

Figure 2:
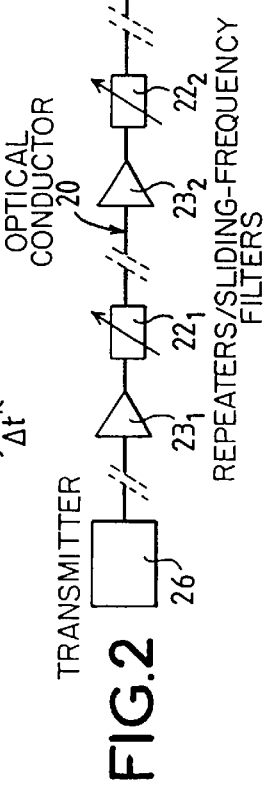
FIG. 2 is a block schematic of an installation of the invention.

This pulse shape is known to deform little when it is transmitted via a fiber of an optical conductor 20 (FIG. 2). This absence of deformation stems from the fact that there is a precise relationship between the peak power P (FIG. 1) of the soliton pulse and its half-amplitude width $\Delta t$, this relationship depending on the characteristics of the fiber, i.e. the non-linear part $n_2$ of the refractive index—which is known as the Kerr index—and the dispersion D. This relationship is such that the effects of dispersion and non-linearity cancel each other out.

In the preferred embodiment of the invention shown in FIG. 2 there is a phase modulator 21 half-way along the line and sliding-frequency filters $22_1$, $22_2$, ..., $22_n$, each filter being associated with an optical amplifier or repeater $23_1$, $23_2$, ..., $23_n$. The line 20 is 8,000 kilometers long, for example.

The phase modulator 21—which will be described below, in particular with reference to FIGS. 4 and 5—reduces temporal jitter of the soliton pulse received at the receiving end 25 of the line. This jitter, or random variation in the temporal position $t_1$ of the soliton pulse, is essentially constituted of so-called "Gordon-Haus" jitter.

Starting from the observation that a phase modulator 21 cannot satisfactorily compensate the fluctuations of amplitude A—or amplitude jitter—and the accumulation of dispersive waves of the soliton pulse, the sliding-frequency filters $22_1$, $22_2$, ..., $22_n$, also known in themselves, are associated with the phase modulator 21.

Figure 3:
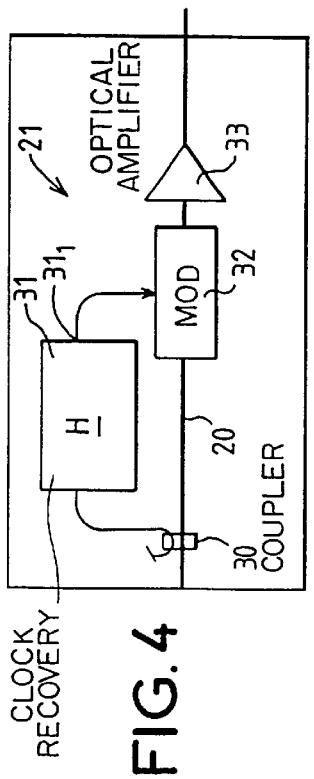
FIG. 3 is a schematic representation of the sliding-frequency filtering principle used in the installation from FIG. 2.

The central wavelength of the filter $22_1$ has a value $\lambda_1$ and the central wavelength of the subsequent filters increases regularly with distance. FIG. 3 shows the variation of the central wavelength of the filters $22_1$, $22_2$, ..., $22_n$ as a function of the length L, i.e. the distance of the filter concerned from the transmitter 26. In this example, the variation of the wavelength $\lambda$ as a function of the length L is linear.

In one example, the wavelength $\lambda$ of the emission laser is 1,558.8 nm, the wavelength $\lambda_1$ is 1,555.8 nm and the wavelength $\lambda_n$ is 1,557 nm.

The variation in the central wavelength of the filters can be different to that described above. For example, the central wavelength of the filters can decrease with distance. Generally, it is sufficient for the frequency to vary with distance.

Sliding-frequency filtering enables transmission of soliton pulses with minimal noise. The result of the progressive variation in the central wavelength of the filters is that each filter blocks noise and dispersive waves due to more distant filters preceding it, these filters having different wavelengths. This technique limits amplitude jitter of the soliton pulses.

To achieve the same aim of improving the signal to noise ratio, in a variant (not shown), instead of filtering at a wavelength that varies with the position, saturable absorbent components are provided, preferably quaternary type semiconductor components such as an $In_xGa_{(1-x)}As_yP_{(1-y)}$ component, which transmit light at the same wavelength as the optical fiber used in the conductor 20, i.e. around 1.55 $\mu$m. This saturable absorbent component is either of the solid type or of the quantum well thin film type.

A saturable absorbent component has an effect in the time domain and not in the spectral domain, as is the case with a filter. It absorbs low amplitudes and passes high amplitudes. In this way noise at the bottom of the pulse, i.e. noise for low amplitudes of the signal, is absorbed by the component.

A thin film, i.e. quantum well, saturable absorbent component is described, for example, in the article "2.4 Gbit/s all optical pulse discrimination experiment using a high-speed saturable absorber optical gate" by H. Tsuda et al—Electronics Letters, Feb. 15, 1996, volume 32, number 4, pages 365 and 366.

Figure 4:
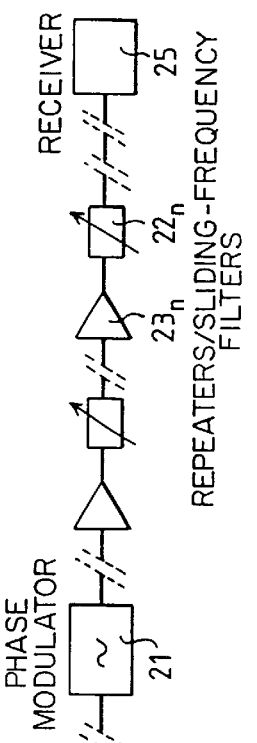
FIG. 4 is a block diagram of a modulator used in the installation from FIG. 2.

FIG. 4 is a block diagram of a phase modulator. This modulator includes a coupler 30 which extracts part of the signal from the optical conductor 20 and feeds it through a device 31 which derives the clock signal from it. The clock signal delivered at the output $31_1$ of the device 31 is a sinusoidal signal and is supplied to a modulation component 32 on the line 20. The effect of the component 32 is to correct the frequency of the soliton pulses proportionately to the time-delay relative to the maxima of the clock signal supplied by the device 31.

The modulation component 32 is followed on the line by an optical amplifier 33, for example an erbium-doped fiber amplifier.

Figure 5:
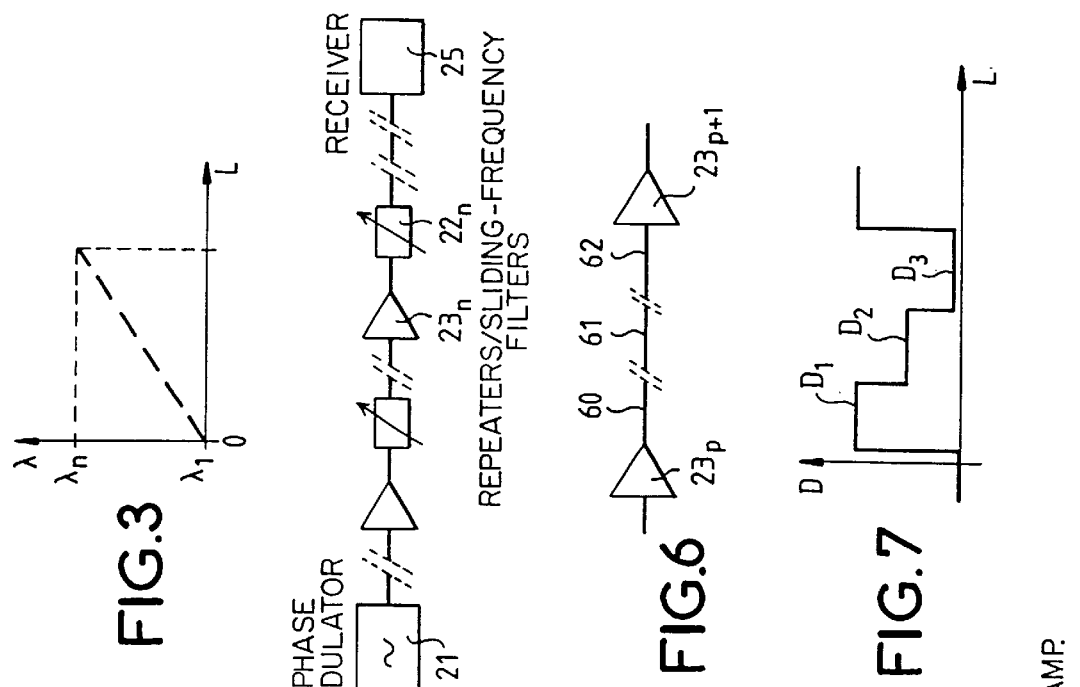
FIG. 5 is a block diagram of one example of a phase modulator and the associated clock recovery system.

FIG. 5 shows one example of a non-linear fiber mirror type phase modulator.

This modulator 21 comprises, in addition to the coupler 30 and the device 31, an optical amplifier 40, for example an erbium-doped fiber amplifier, the input of which is connected to the output of the device 31 and the output $40_1$ of which is connected to a coupler 41 which feeds the signal from the amplifier 40 into a non-linear fiber mirror 42. The non-linear fiber mirror 42 receives the signal from the line 20 via another coupler 43 of the 50-50 type. The latter divides the signal from the line 20 equally between the two branches 44 and 45 of the fiber 46 constituting the active component of the mirror 42. The output signal of the mirror 42 is returned to the line 20 whence it is transmitted to the optical amplifier 33.

A modulator of this kind is known in itself. It is described, for example, in an article by S. Bigo et al in Electronics Letters, volume 31, number 25 of Dec. 7, 1995, pages 2191 and 2192.

A modulator of this kind applies amplitude modulation and phase modulation at the same time. In this example the latter modulation is an alternating phase-shift of π radians.

Alternatively (not shown), instead of a non-linear fiber mirror modulator, an electro-absorption modulator is used which, like the modulator previously described, applies intensity modulation at the same time as phase modulation. An electro-absorption modulator of this kind has a semiconductor active component, for example a component based on $In_xGa_{(1-x)}As_yP_{(1-y)}$ In this semiconductor component, modulation is the result of modification of the refractive index and modification of the absorption coefficient. This component is known in itself. It is described, for example, in an article by Widdowson et al in Electronics Letters, Oct. 27, 1994, volume 30, number 22, pages 1866–1868.

The phase modulation can instead be obtained using an optical fiber component having a length between several hundred meters and several kilometers. The clock signal from the device 31 and the main signal from the line 20 propagate in this fiber. In this case, the modulation is said to be distributed as opposed to discrete modulation, such as is obtained with an electro-absorption modulator. Modulation using a non-linear fiber in this way is described, for example, in the article by Widdowson et al in Electronics Letters, Jun. 9, 1994, volume 30, number 12, pages 990 and 991.

To reduce losses further, dispersion control components can be provided on the line 20, in a manner that is known in itself. It has been found that such dispersion control is compatible with the combination of phase modulation and sliding-frequency filtering or a set of saturable absorption components.

Figure 6:
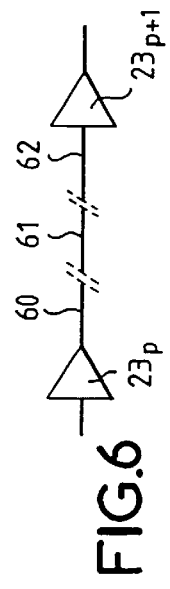
FIG. 6 is a block diagram of other components included in the installation from FIG. 2.
Figure 7:
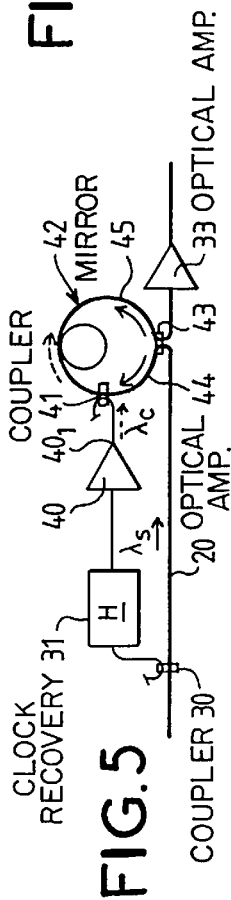
FIG. 7 is a diagram showing the properties of the components from FIG. 6.

Dispersion can be controlled in two ways. The first is by dispersion profiling between two optical amplifiers. This profiling consists in providing a limited number of dispersive fibers between two amplifiers, the overall dispersion simulating an exponential reduction. This implementation is shown in FIG. 6 and FIG. 7. FIG. 6 shows, between two amplifiers $23_p$ and $23_{p+1}$, fiber optic components 60, 61 and 62. The component 60 has a dispersion $D_1$ (FIG. 7), the component 61 has a dispersion $D_2$ and the component 62 a dispersion $D_3$. Profiling can instead by obtained by a single fiber having dispersion that decreases exponentially.

The second way to control dispersion (not shown) is to introduce into the line, between n (at least two) selected amplifiers, at least one optical fiber having a dispersion that is opposed to the overall dispersion of the fibers on its upstream side. This compensator fiber can equally well be provided at more than one place on the line.

Regardless of the embodiment, it has been found that a transmission system using the soliton format with sliding-frequency filtering or saturable absorbent components, combined with phase modulation, for example a modulator half-way along the line, assures minimal distortion of the soliton pulse and enables high performance in terms of bit rate, in excess of 10 Gbit/s, e.g. 20 Gbit/s and even 100 Gbit/s or more. Moreover, the distance between two repeaters is large; it is in excess of 100 kilometers. The latter property is favorable to the implementation of a system of this kind at low cost.

The examples described above relate to the transmission of a single optical wavelength on the line 20. However, the invention applies to the situation in which the line transmits different optical wavelengths emitted by different sources. In this case, the sliding-frequency filtering will be provided by Fabry-Perot type filters each of which has a plurality of transmission peaks corresponding to the wavelengths of the signal generator sources. Moreover, in this case, the phase modulator or modulators must be positioned—or the optical wavelengths must be chosen—so that all the optical wavelengths arrive at the same time.

What is claimed is:

1. A system for carrying digital signals transmitted between a transmitter and a receiver over a communications path including an optical conductor, said system comprising:
   said signals being in the form of soliton pulses,
   means for minimizing distortion of the transmitted soliton pulses comprising:
      a phase modulator, positioned between said transmitter and said receiver in said communications path, to prevent temporal jitter of the pulses; and
      a set of filters of the type in which the frequency varies with the location of said filter to prevent deterioration of the signal to noise ratio of the pulses.

2. The system claimed in claim 1 wherein said phase modulator comprises a non-linear fiber mirror.

3. The system claimed in claim 1 wherein each said filter is associated with a repeater that is an optical amplifier.

4. A system as claimed in claim 1 further comprising dispersion control means.

5. The system as claimed in claim 4 wherein said dispersion control means include a fiber or a set of fibers between two successive repeaters procuring a particular dispersion profile.

6. A system as claimed in claim 4 including at least one dispersion correction component on the line.

7. A system as claimed in claim 1 wherein the data bit rate is at least 10 Gbit/s.

8. A system as claimed in claim 1 wherein the distance between two adjacent repeaters is at least 100 kilometers.

9. The system as claimed in claim 1 wherein said optical conductor comprises an underwater cable.

10. A system for carrying digital signals transmitted between a transmitter and a receiver over a communications path including an optical conductor, said system comprising:

said signals being in the form of soliton pulses, and means for minimizing distortion of the transmitted soliton pulses, comprising:

a phase modulator, positioned between said transmitter and said receiver in said communications path, to prevent temporal jitter of the pulses; and only one of (A.) a set of filters of the type in which the frequency varies with the location of said filter, and (B.) a set of saturable absorbent components to prevent deterioration of the signal to noise ratio of the pulses;

wherein said phase modulator comprises a clock signal recovery device and a modulator component receiving the signal at one input and the clock signal from said device at another input.

11. The system claimed in claim 1 wherein said phase modulator is of the electro-absorption modulation type.

12. The system claimed in claim 11 wherein said electro-absorption modulator includes an $In_xGA_{(1-x)}As_yP_{(1-y)}$ type quaternary component.

13. The system claimed in claim 10 wherein said means for minimizing distortion comprises said set of saturable absorbent components, each being of the semiconductor type.

14. The system claimed in claim 13 wherein said saturable absorbent components comprise quaternary components.

15. The system claimed in claim 14 wherein said quaternary components comprise $In_xGA_{(1-x)}As_yP_{(1-y)}$.

16. A system for carrying digital signals transmitted between a transmitter and a receiver over a communications path including an optical conductor, said system comprising:

said signals being in the form of soliton pulses, and means for minimizing distortion of the transmitted soliton pulses comprising:

a phase modulator, positioned between said transmitter and said receiver in said communications path, to prevent temporal jitter of the pulses; and only one of (A.) a set of filters of the type in which the frequency varies with the location of said filter, and (B.) a set of saturable absorbent components to prevent deterioration of the signal to noise ratio of the pulses;

wherein said phase modulator comprises a non-linear optical component phase modulator along which a clock pulse and a pulse on the line propagate together over a particular length.

17. The system claimed in claim 16 wherein said means for minimizing distortion comprises said set of saturable absorbent components, each being of the semiconductor type.

18. The system claimed in claim 17 wherein said saturable absorbent components comprise quaternary components.

19. The system claimed in claim 18 wherein said quaternary components comprise $In_xGA_{(1-x)}As_yP_{(1-y)}$.

* * * * *